(12) United States Patent
Ishii et al.

(10) Patent No.: US 8,985,537 B2
(45) Date of Patent: Mar. 24, 2015

(54) SUPPORT ARM

(75) Inventors: Daisuke Ishii, Toyota (JP); Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/638,384

(22) PCT Filed: Sep. 13, 2010

(86) PCT No.: PCT/JP2010/065716
§ 371 (c)(1),
(2), (4) Date: Sep. 28, 2012

(87) PCT Pub. No.: WO2012/035593
PCT Pub. Date: Mar. 22, 2012

(65) Prior Publication Data
US 2013/0157501 A1    Jun. 20, 2013

(51) Int. Cl.
*E04G 3/00*    (2006.01)
*F16L 3/015*    (2006.01)
*B25J 9/10*    (2006.01)
*B25J 19/00*    (2006.01)
*H01R 13/60*    (2006.01)
(Continued)

(52) U.S. Cl.
CPC ............ *F16L 3/015* (2013.01); *B25J 9/1065* (2013.01); *B25J 19/0016* (2013.01); *H01R 13/60* (2013.01); *F16M 11/14* (2013.01); *F16M 11/18* (2013.01); *F16M 11/2092* (2013.01); *F16M 11/24* (2013.01); *F16M 2200/044* (2013.01); *F16M 2200/063* (2013.01)
USPC ...................... 248/283.1; 248/278.1; 248/585

(58) Field of Classification Search
CPC .............. F16M 11/04; F16M 11/2092; F16M 2200/063; F16M 11/10; F16M 2200/065; F16M 13/00; F16M 11/38; B25J 18/00
USPC .......... 248/274.1, 276.1, 283.1, 284.1, 278.1, 248/585
See application file for complete search history.

(56) References Cited

U.S. PATENT DOCUMENTS 4,208,028 A * 6/1980 Brown et al. ................. 224/185
5,306,999 A * 4/1994 Hoffman ....................... 320/109
(Continued)

FOREIGN PATENT DOCUMENTS

JP    A-4-133585    12/1992
JP    U-4-133585    12/1992
(Continued)

OTHER PUBLICATIONS

U.S. Appl. No. 13/141,841, filed Jun. 23, 2011.

*Primary Examiner* — Bradley Duckworth
(74) *Attorney, Agent, or Firm* — Oliff PLC (57) ABSTRACT

A support arm includes a bracket supported by a support, a bracket arranged away from the bracket, a parallel link arranged between the bracket and the bracket and coupled pivotally to the bracket and the bracket, and a self-weight compensation device producing a force that cancels a force of gravity acting on the parallel link. The parallel link has an upper shaft and a lower shaft arranged in parallel to each other with spacing, the spacing being changed with a pivoting movement of the parallel link. The upper shaft and the lower shaft are arranged offset with respect to each other in a direction of an axis on which the parallel link is pivoted. With such a structure, a support arm for which a large movable range is achieved is provided.

7 Claims, 12 Drawing Sheets

(51) Int. Cl.
*F16M 11/14* (2006.01)
*F16M 11/18* (2006.01)
*F16M 11/20* (2006.01)
*F16M 11/24* (2006.01)

(56) References Cited

U.S. PATENT DOCUMENTS

| | | | | |
|---|---|---|---|---|
| 5,813,286 | A * | 9/1998 | Hansen | 74/490.02 |
| 6,550,734 | B1 * | 4/2003 | Spadea | 248/280.11 |
| 7,464,909 | B2 * | 12/2008 | Li | 248/280.11 |
| 7,546,994 | B2 * | 6/2009 | Altonji et al. | 248/276.1 |
| 7,562,851 | B2 * | 7/2009 | Hein et al. | 248/281.11 |
| 8,074,949 | B2 * | 12/2011 | Oddsen et al. | 248/276.1 |
| 2003/0075658 | A1 * | 4/2003 | Beissel et al. | 248/284.1 |
| 2004/0021051 | A1 * | 2/2004 | Chiu | 248/371 |
| 2004/0084587 | A1 * | 5/2004 | Oddsen | 248/284.1 |
| 2006/0263082 | A1 * | 11/2006 | Brown | 396/421 |
| 2008/0093522 | A1 * | 4/2008 | Oddsen et al. | 248/276.1 |
| 2013/0062476 | A1 | 3/2013 | Ishii et al. | |

FOREIGN PATENT DOCUMENTS

| | | |
|---|---|---|
| JP | A-9-296856 | 11/1997 |
| JP | A-10-225891 | 8/1998 |
| JP | A-11-262889 | 9/1999 |
| JP | A-2003-71759 | 3/2003 |
| JP | A-2003-89090 | 3/2003 |
| JP | A-2003-181789 | 7/2003 |
| JP | B-5263396 | 8/2013 |

* cited by examiner

SUPPORT ARM

TECHNICAL FIELD

The present invention generally relates to a support arm, and more particularly relates to a support arm for supporting a charging connector connected to a hybrid vehicle, an electric vehicle or the like.

BACKGROUND ART

A support arm having a self-weight compensation function to attain a balance with a force of gravity acting on the arm is conventionally known. For such a device, Japanese Patent Laying-Open No. 2003-181789, for example, discloses a mechanical self-weight compensation device intended to attain, with a simple structure, a balance with the force of gravity on an actuating arm with respect to orthogonal three axes in space (PTL 1). PTL 1 presents a device (FIG. 6) in which upper and lower two arms constitute a parallel link as a conventional mechanism.

Japanese Patent Laying-Open No. 9-296856 discloses a manipulator intended to achieve a smaller weight and a higher output of a drive source (PTL 2). The manipulator disclosed in PTL 2 has a first arm attached to a frame via a first joint so as to be able to swing, a second arm supported by the leading end of the first arm via a second joint so as to be able to swing, and a gripper for holding a work, the gripper being mounted on the leading end of the second arm. The first arm arranged between the first joint and the second joint is formed by a pair of link members constituting a parallelogram link.

CITATION LIST

Patent Literature

PTL 1: Japanese Patent Laying-Open No. 2003-181789
PTL 2: Japanese Patent Laying-Open No. 9-296856

SUMMARY OF INVENTION

Technical Problem

As disclosed in above-mentioned PTL 1 and PTL 2, a parallel link mechanism being deformed while a pair of shafts arranged in parallel maintain parallelism is used for the support arm. However, the support arms disclosed in PTL 1 and PTL 2 arise concern that the pair of shafts interfere with each other at the time of folding the support arm, which limits the movable range of the support arm.

The present invention therefore has an object to solve the above-described subject, and to provide a support arm that can achieve a large movable range.

Solution to Problem

A support arm according to the present invention includes a first joint part supported by a base, a second joint part arranged away from the first joint part, a first parallel link arranged between the first joint part and the second joint part and coupled pivotally to the first joint part and the second joint part, and a self-weight compensation device producing a force that cancels a force of gravity acting on the first parallel link. The first parallel link has a first shaft and a second shaft arranged in parallel to each other with spacing, the spacing being changed with a pivoting movement of the first parallel link. The first shaft and the second shaft are arranged offset with respect to each other in a direction of an axis on which the first parallel link is pivoted.

With the support arm thus constructed, the first parallel link can be operated by a smaller force by providing the self-weight compensation device. In this case, the first shaft and the second shaft will not interfere with each other when pivoting the first parallel link with respect to the first joint part and the second joint part, since the first shaft and the second shaft are arranged offset with respect to each other in the direction of the axis on which the first parallel link is pivoted. Accordingly, the pivot range of the first parallel link is enlarged, and a large movable range can be set for the support arm.

Preferably, a stored state of the support arm is attained when the first parallel link is positioned to rise upwardly from the first joint part. In the stored state, the first shaft and the second shaft are arranged to overlap each other when seen from the direction of the axis on which the first parallel link is pivoted. With the support arm thus constructed, the stored state of the support arm can be made compact.

Still preferably, in the stored state of the support arm, the first shaft and the second shaft extend in a vertical direction from the first joint part toward the second joint part. With the support arm thus constructed, the stored state of the support arm can be made more compact.

Still preferably, the first parallel link has a plurality of the first shafts arranged offset with respect to the second shaft in the direction of the axis on which the first parallel link is pivoted. With the support arm thus constructed, the durability of the support arm can be improved by distributing a force acting on the first parallel link to the plurality of the first shafts.

Still preferably, the plurality of the first shafts are arranged symmetrically on the both sides of the second shaft in the direction of the axis on which the first parallel link is pivoted. With the support arm thus constructed, the durability of the support arm can be improved further by distributing the force acting on the first parallel link to the plurality of the first shafts equally.

Still preferably, when the first parallel link is positioned to extend laterally from the first joint part, the first shaft is located above the second shaft. The second shaft has a thickness greater than the thickness of the first shaft. With the support arm thus constructed, since the weight of the first shaft, in addition to the weight of the second shaft itself, acts on the second shaft, the second shaft has a thickness greater than that of the first shaft. This can increase the second shaft in rigidity and can improve the support arm in durability.

Still preferably, a wiring line extending from the first joint part toward the second joint part is fixed to the second shaft. With the support arm thus constructed, the wiring line can be supported by the second shaft of high rigidity.

Still preferably, the support arm further includes a third joint part arranged away from the second joint part, and a second parallel link arranged between the second joint part and the third joint part and coupled pivotally to the second joint part and the third joint part. The second parallel link has a third shaft and a fourth shaft arranged in parallel to each other with spacing, the spacing being changed with a pivoting movement of the second parallel link. The third shaft and the fourth shaft are arranged offset with respect to each other in a direction of an axis on which the second parallel link is pivoted.

With the support arm thus constructed, the third shaft and the fourth shaft will not interfere with each other when pivoting the second parallel link with respect to the second joint part and the third joint part, since the third shaft and the fourth shaft are arranged offset with respect to each other in the direction of the axis on which the second parallel link is pivoted. Accordingly, the pivot range of the second parallel link is also enlarged in addition to the pivot range of the first parallel link, and an even larger movable range can thereby be set for the support arm.

Still preferably, a stored state of the support arm is attained when the first parallel link is positioned to rise upwardly from the first joint part and the second parallel link is folded toward the first parallel link with the second joint part serving as a fulcrum. In the stored state, the first shaft and the second shaft are arranged to overlap each other when seen from the direction of the axis on which the first parallel link is pivoted, and the third shaft and the fourth shaft are arranged to overlap each other when seen from the direction of the axis on which the second parallel link is pivoted. With the support arm thus constructed, the stored state of the support arm can be made compact.

Still preferably, the support arm further includes a charging connector provided to be connectable to a vehicle, and moving with the pivoting movement of the first parallel link. With the support arm thus constructed, a large movable range can be set for the support arm for supporting the charging connector of a vehicle.

Advantageous Effects of Invention

As described above, according to the present invention, the support arm that achieves a large movable range can be provided.

DESCRIPTION OF EMBODIMENTS

An embodiment of the present invention will be described with reference to the drawings. It is noted that, in the drawings referred to in the following, the same or corresponding members have the same reference characters allotted.

Figure 1:
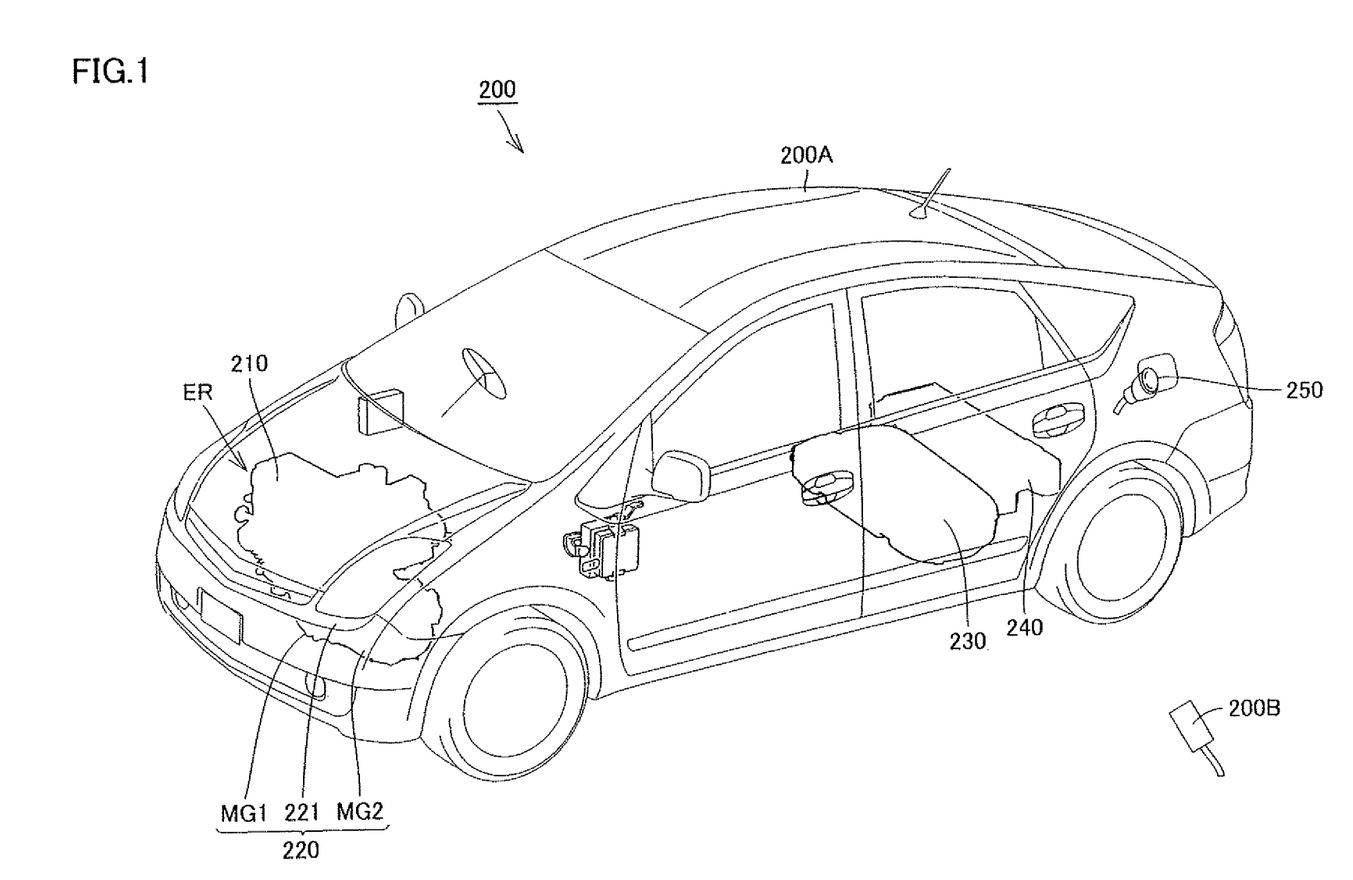
FIG. 1 is a perspective view of a hybrid vehicle when seen from one side surface.
Figure 2:
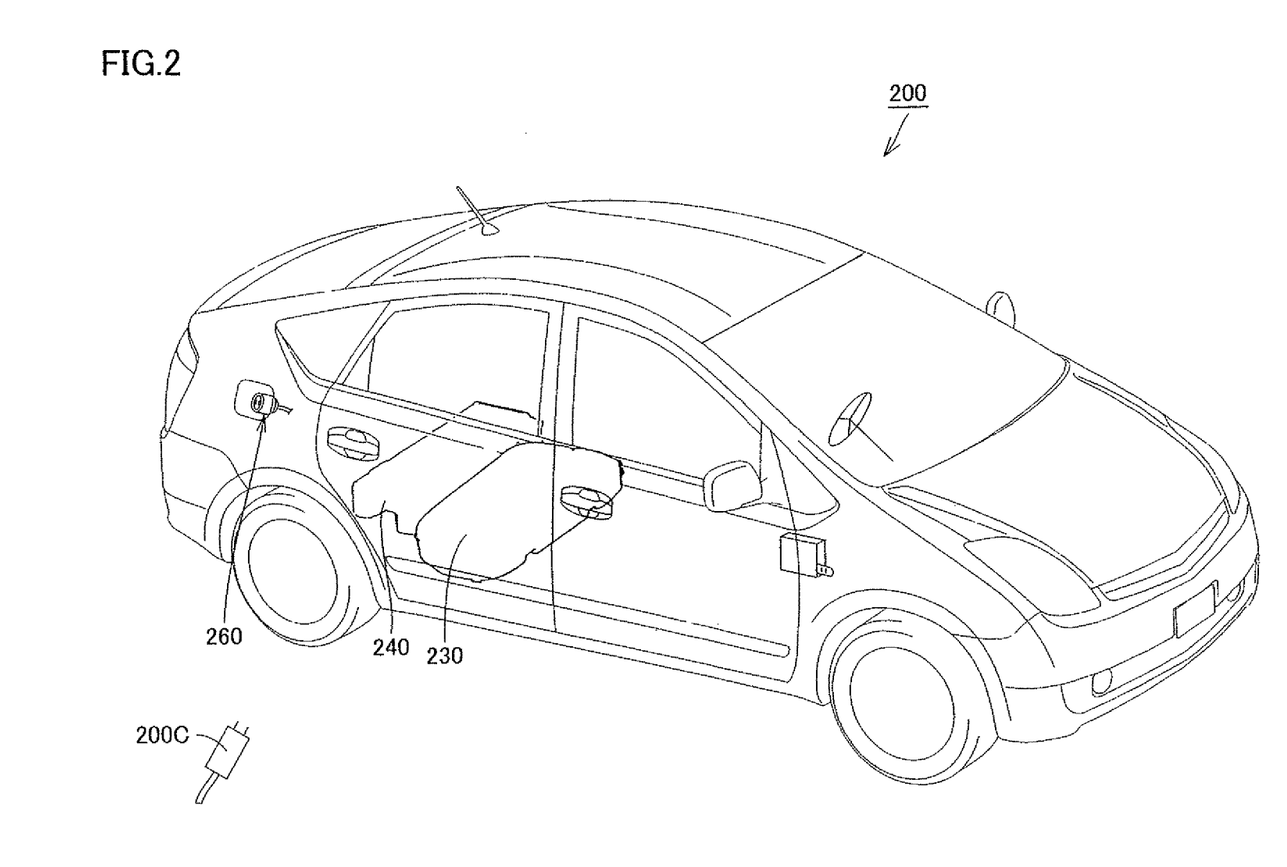
FIG. 2 is a perspective view of the hybrid vehicle of FIG. 1 when seen from the other side surface.

FIG. 1 is a perspective view of a hybrid vehicle when seen from one side surface. FIG. 2 is a perspective view of the hybrid vehicle of FIG. 1 when seen from the other side surface.

Referring to FIGS. 1 and 2, a hybrid vehicle 200 is a vehicle having, as power sources, an internal combustion engine 210 supplied with fuel and motor-generators MG1, MG2 as electric motors supplied with electric power from a rechargeable power storage device 240. Hybrid vehicle 200 has a body 200A constituting the vehicle appearance, internal combustion engine 210, a transaxle 220, a fuel tank 230, a power storage device 240, a fuel supply part 250, and an electric power supply unit 260.

Internal combustion engine 210 is housed in an engine compartment ER. Typically, internal combustion engine 210 is a gasoline engine or a diesel engine, and generates motive power that drives wheels by being supplied with gasoline.

Transaxle 220 is housed in engine compartment ER together with internal combustion engine 210. Transaxle 220 has motor-generators MG1, MG2, and a power split mechanism 221.

Power split mechanism 221 is linked to internal combustion engine 210 and motor-generators MG1, MG2, and distributes motive power among them. For example, power split mechanism 221 is implemented by a planetary gear mechanism having three rotation shafts of a sun gear, a planetary carrier and a ring gear. These three rotation shafts are connected to the rotation shafts of internal combustion engine 210, motor-generators MG1 and MG2, respectively. For example, it is possible to mechanically connect internal combustion engine 210 and motor generators MG1, MG2 to power split mechanism 221 by making the rotor of motor generator MG1 hollow and passing a crank shaft of internal combustion engine 210 through the center thereof.

The rotation shaft of motor-generator MG2 is linked to the wheels by a reduction gear or a differential gear not shown. A reducer for the rotation shaft of motor-generator MG2 may be further incorporated in power split mechanism 221.

Motor-generator MG1 is incorporated in hybrid vehicle 200 as operating as a power generator driven by internal combustion engine 210 and operating as an electric motor that can start internal combustion engine 210. Motor-generator MG2 is incorporated in hybrid vehicle 200 as an electric motor that drives the wheels of hybrid vehicle 200.

Motor-generators MG1 and MG2 are three-phase AC synchronous motors, for example. Motor-generators MG1 and MG2 each have a three-phase coil composed of a U-phase coil, a V-phase coil and a W-phase coil, as a stator coil.

Motor-generator MG1 produces a three-phase AC voltage using the output of internal combustion engine 210, and outputs the produced three-phase AC voltage to an inverter not shown. Motor-generator MG1 produces a driving force from the three-phase AC voltage received from the inverter to start internal combustion engine 210.

Motor-generator MG2 produces a torque driving the vehicle by the three-phase AC voltage received from the inverter. Motor-generator MG2 produces a three-phase AC voltage during regenerative braking of the vehicle, and outputs the voltage to the inverter.

The inverter not shown converts DC power stored in power storage device 240 into AC power for supply to motor-generators MG1 and MG2. The inverter converts AC power supplied from motor-generators MG1 and MG2 into DC power for supply to power storage device 240.

Fuel tank 230 is provided at a position located below a rear seat in a vehicle cabin. Fuel tank 230 contains gasoline which is a liquid fuel. Fuel tank 230 contains ethanol, propane gas which is a gaseous fuel, or the like depending on the type of internal combustion engine 210.

Power storage device 240 is provided at a position located below the rear seat in the vehicle cabin. Power storage device 240 can be implemented by a secondary battery, such as, for example, a nickel-metal hydride battery, a lithium ion battery, or a lead battery. Alternatively, power storage device 240 can be implemented by a large-capacity electric double layer capacitor.

Fuel supply part 250 is provided on one side surface of body 200A. Fuel supply part 250 is provided such that a fuel supply connector 200B can be connected thereto. By connecting fuel supply connector 200B to fuel supply part 250, fuel tank 230 is supplied with fuel from the outside. Electric power supply unit 260 is provided on the other side of body 200A. Electric power supply unit 260 is provided such that a charging connector 200C can be connected thereto. By connecting charging connector 200C to electric power supply unit 260, power storage device 240 is supplied with electric power from the outside.

Figure 3:
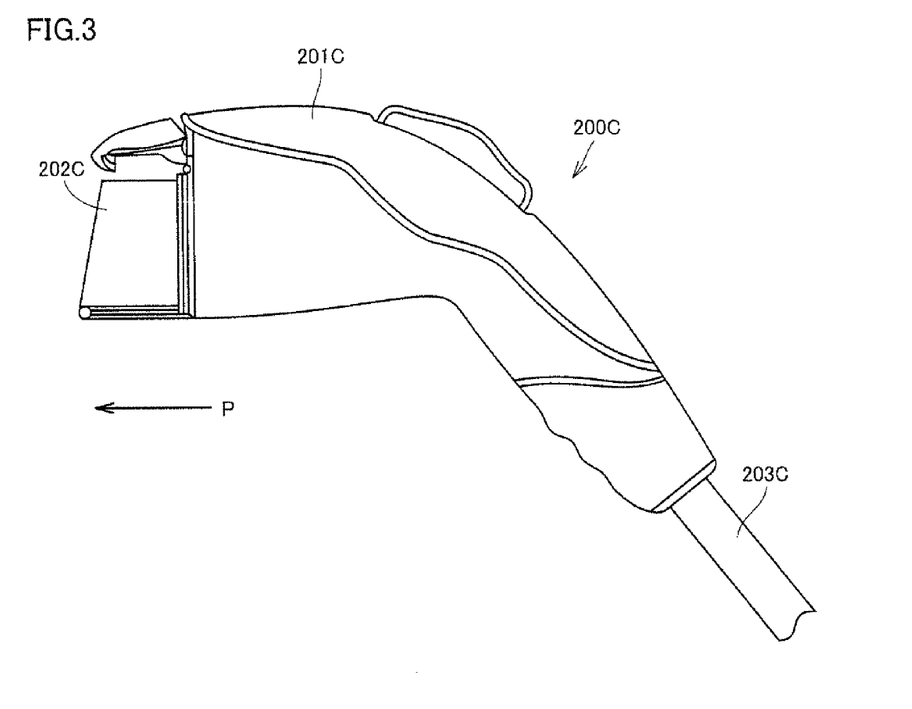
FIG. 3 is a side view showing a charging connector shown in FIG. 2.

FIG. 3 is a side view showing the charging connector shown in FIG. 2. Referring to FIG. 3, charging connector 200C has a body 201C and a connecting part 202C. A power wiring line 203C is connected to body 201C. Connecting part 202C of charging connector 200C is fitted into electric power supply unit 260 at the time of charging power storage device 240.

Connecting part 202C is formed in a tubular shape. Connecting part 202C protrudes from the leading end of body 201C in the direction of insertion P toward electric power supply unit 260.

Figure 4:
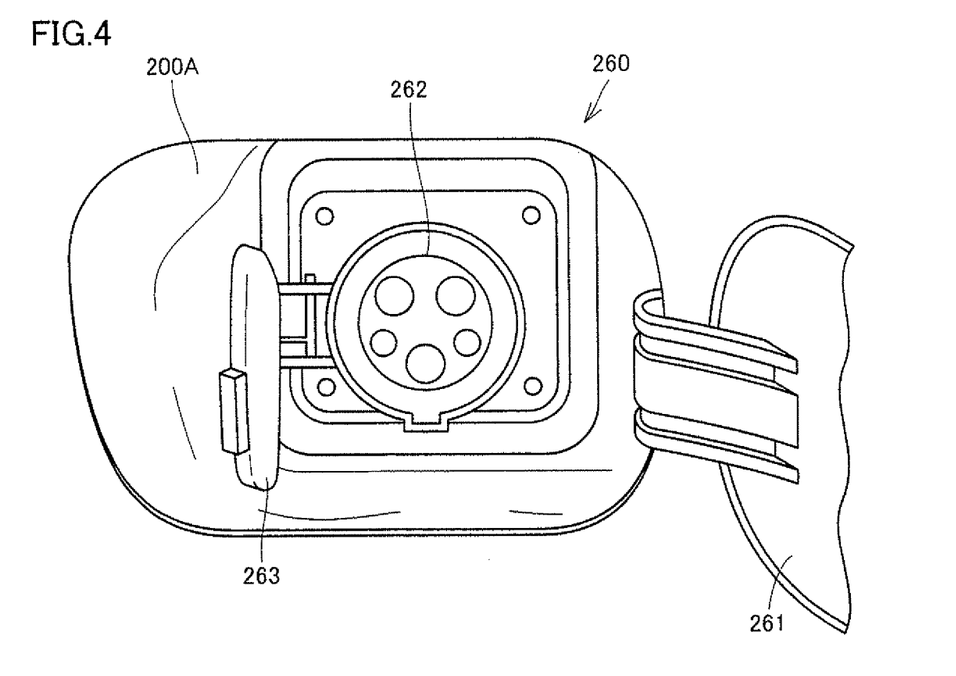
FIG. 4 is a front view showing an electric power supply unit shown in FIG. 2.

FIG. 4 is a front view showing the electric power supply unit shown in FIG. 2. Referring to FIG. 4, electric power supply unit 260 has an outer lid 261, a head part 262 and an inner lid 263. Outer lid 261 opens/closes an opening formed in a rear fender of body 200A. Head part 262 is provided in body 200A. Inner lid 263 is provided so as to cover the end face of head part 262.

Head part 262 is formed in a cylindrical shape. A plurality of holes for receiving terminals and the tubular part provided in charging connector 200C are formed in the end face of head part 262. As described above, connecting part 202C of charging connector 200C is formed in a hollow tubular shape. Connecting part 202C can thereby accept head part 262. By head part 262 entering connecting part 202C, the respective terminals of charging connector 200C enter the holes formed in head part 262. This enables charging through charging connector 200C.

Charging connector 200C is supported by a support arm according to the present embodiment. The support arm is folded when not in use (when charging is not carried out), and is in an extended state when in use (when charging is carried out). In the present specification, the folded state when not in use will be referred to as a "stored state", and the extended state when in use will be referred to as a "usage state." In this way, by constructing the support arm to be foldable when not in use, the support arm can be installed utilizing space efficiently.

Figure 5:
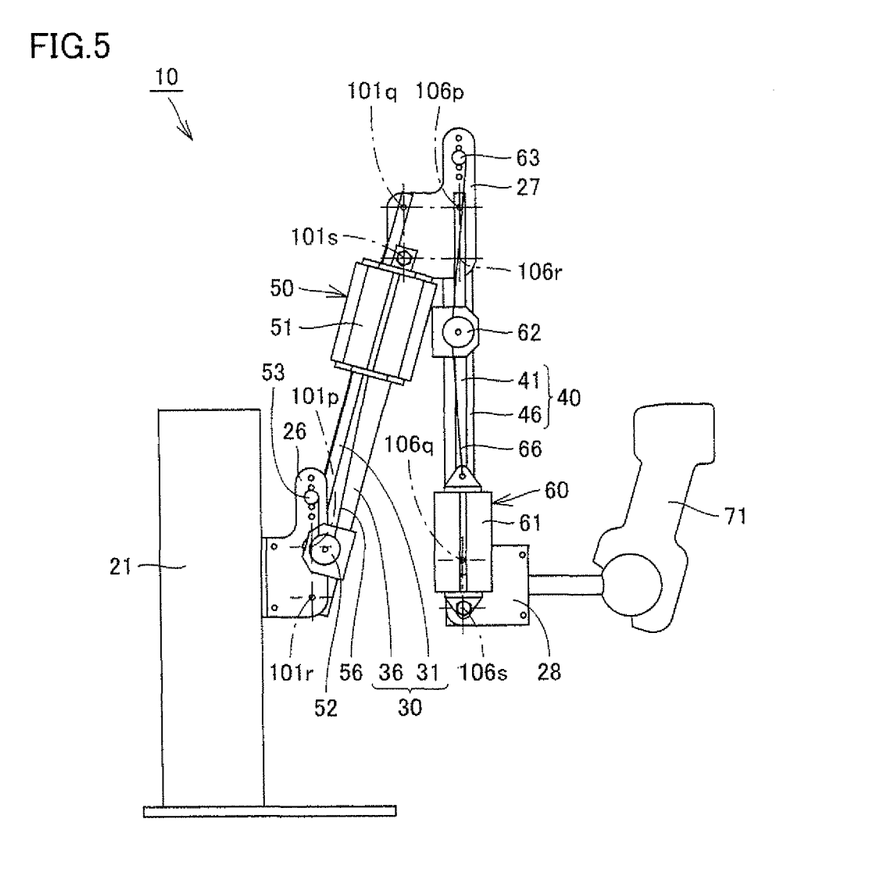
FIG. 5 is a side view showing a stored state of a support arm according to an embodiment of the present invention.
Figure 6:
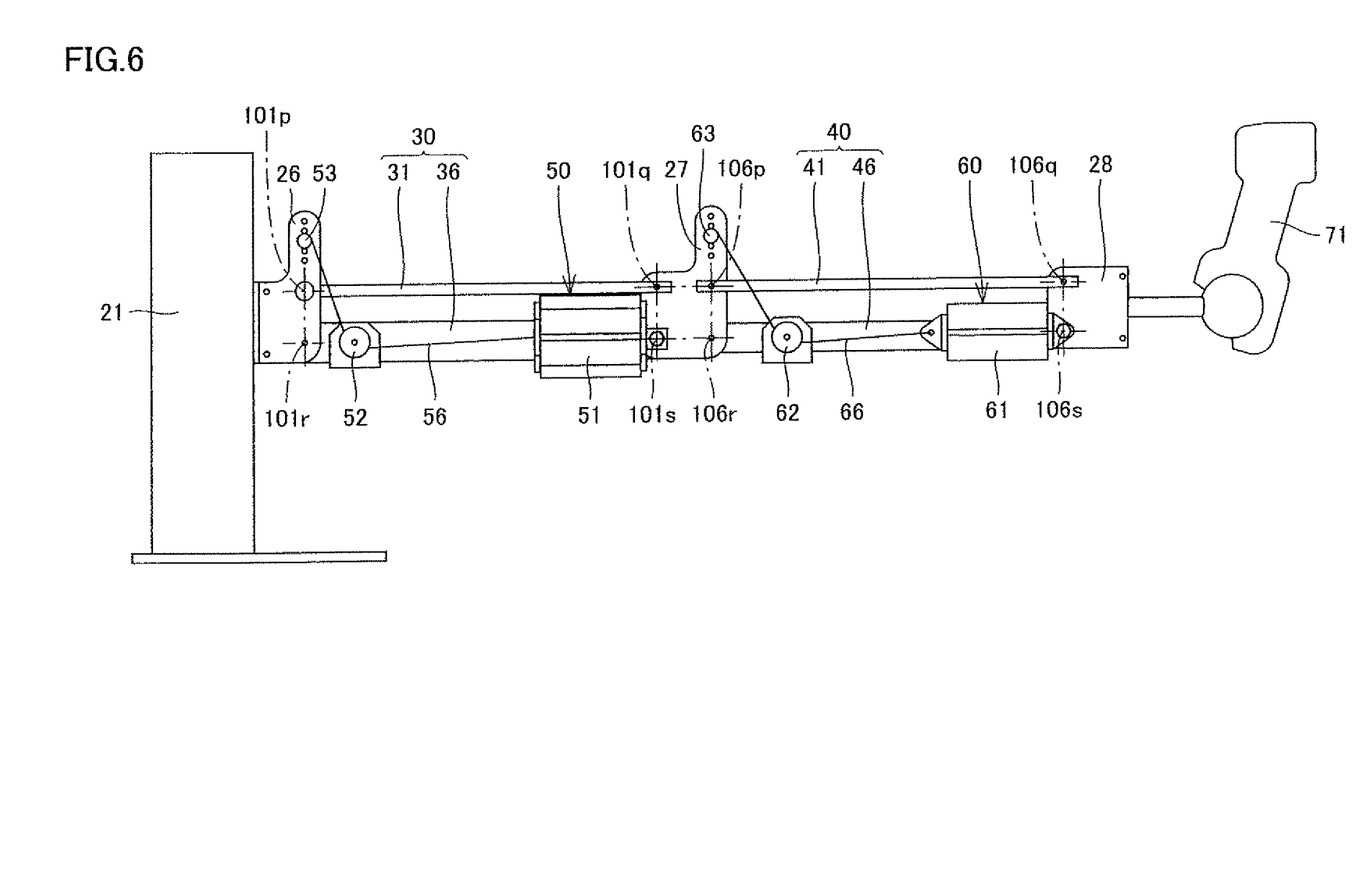
FIG. 6 is a side view showing a usage state of the support arm shown in FIG. 5.
Figure 7:
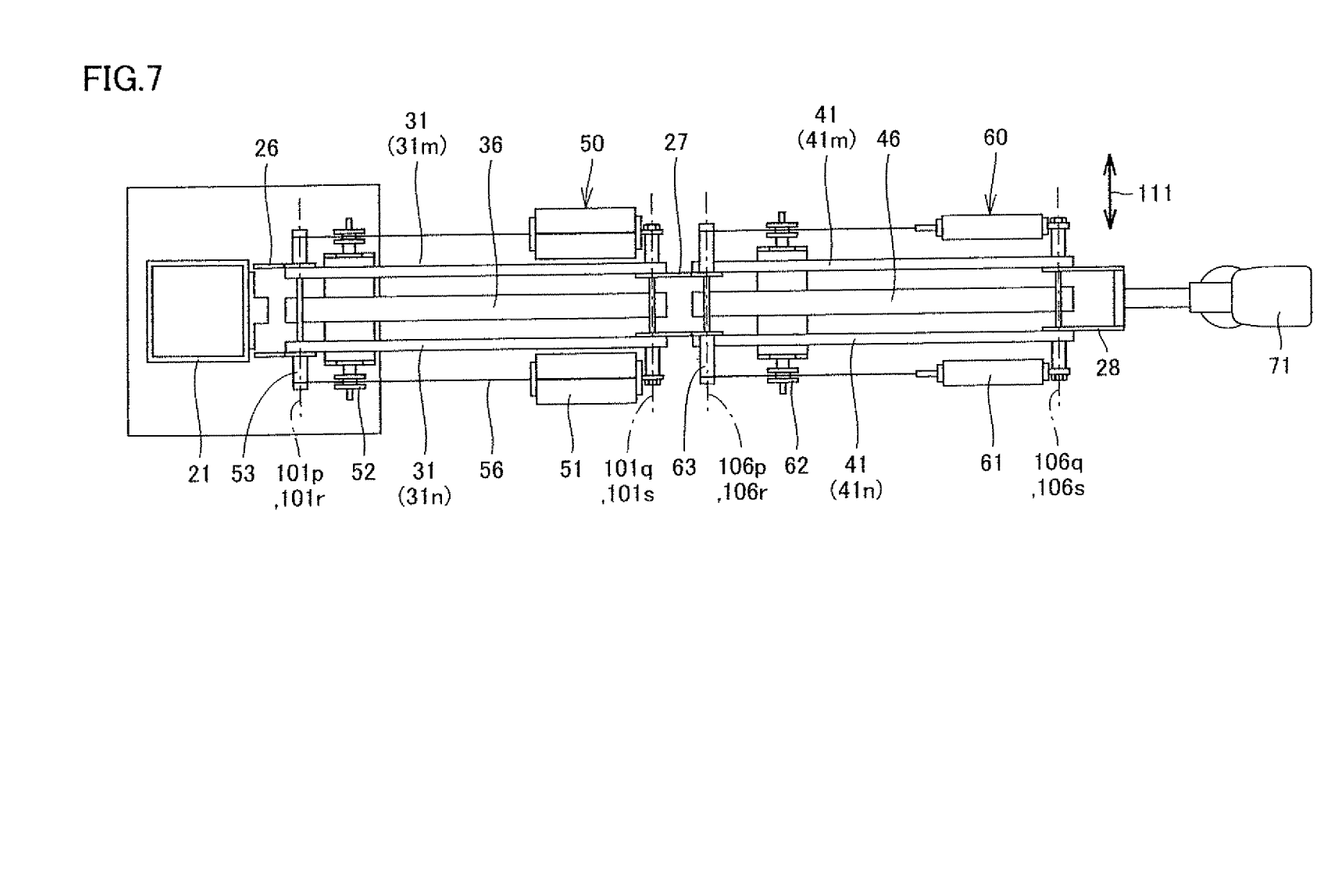
FIG. 7 is a top view showing the usage state of the support arm shown in FIG. 5.

FIG. 5 is a side view showing the stored state of the support arm according to the embodiment of the present invention. FIG. 6 is a side view showing the usage state of the support arm shown in FIG. 5. FIG. 7 is a top view showing the usage state of the support arm shown in FIG. 5.

Referring to FIGS. 5 to 7, a support arm 10 according to the present embodiment has a bracket 26, a parallel link 30, a bracket 27, a parallel link 40, and a bracket 28.

Bracket 26 is fixed to a support 21 installed in a charging stand. Bracket 27 is provided away from bracket 26. Parallel link 30 is provided between brackets 27 and 26. Parallel link 30 is coupled pivotally to brackets 27 and 26 using bearings not shown.

Bracket 28 is provided away from bracket 27. Parallel link 40 is provided between brackets 27 and 28. Parallel link 40 is coupled pivotally to brackets 27 and 28 using bearings not shown. A charging connector attachment part 71 to which charging connector 200C shown in FIG. 2 is to be attached is connected to bracket 28.

Parallel link 30 has an upper shaft 31 and a lower shaft 36. Upper shaft 31 and lower shaft 36 are arranged in parallel to each other with spacing. In the usage state of support arm 10 shown in FIG. 6, upper shaft 31 is positioned above lower shaft 36. In the present embodiment, upper shafts $31m$ and $31n$ are provided as upper shaft 31.

Upper shaft 31 has one end coupled to bracket 26 so as to pivot about a central axis $101p$. Upper shaft 31 has the other end coupled to bracket 27 so as to pivot about a central axis $101q$. Upper shaft 31 is formed extending linearly from central axis $101p$ toward central axis $101q$. Lower shaft 36 has one end coupled to bracket 26 so as to pivot about a central axis $101r$. Lower shaft 36 has the other end coupled to bracket 27 so as to pivot about a central axis $101s$. Lower shaft 36 is formed extending linearly from central axis $101r$ toward central axis $101s$.

Central axes $101p$, $101q$, $101r$, and $101s$ extend in parallel to one another. Central axes $101p$ and $101r$ are arranged on the same straight line extending in the vertical direction. Central axes $101q$ and $101s$ are arranged on the same straight line extending in the vertical direction. The distance between central axes $101p$ and $101q$ is equal to the distance between central axes $101r$ and $101s$.

In support arm 10 according to the present embodiment, upper shaft 31 and lower shaft 36 are arranged offset with respect to each other in the direction of the axis on which parallel link 30 is pivoted, that is, the axial direction of central axes $101p$ to $101r$ (the direction indicated by an arrow 111 in FIG. 7).

More specifically, upper shafts $31m$ and $31n$ are arranged on the both sides of lower shaft 36 in the axial direction of central axes $101p$ to $101r$. Upper shafts $31m$ and $31n$ are arranged equally on the both sides of lower shaft 36. That is, the distance between lower shaft 36 and upper shaft $31m$ in the axial direction of central axes $101p$ to $101r$ is equal to the distance between lower shaft 36 and upper shaft $31n$ in the axial direction of central axes $101p$ to $101r$.

Parallel link 40 has an upper shaft 41 and a lower shaft 46. Upper shaft 41 and lower shaft 46 are arranged in parallel to each other with spacing. In the usage state of support arm 10 shown in FIG. 6, upper shaft 41 is positioned above lower shaft 46. In the present embodiment, upper shafts $41m$ and $41n$ are provided as upper shaft 41.

Upper shaft 41 has one end coupled to bracket 27 so as to pivot about a central axis $106p$. Upper shaft 41 has the other end coupled to bracket 28 so as to pivot about a central axis $106q$. Upper shaft 41 is formed extending linearly from central axis $106p$ toward central axis $106q$. Lower shaft 46 has one end coupled to bracket 27 so as to pivot about a central axis $106r$. Lower shaft 46 has the other end coupled to bracket 28 so as to pivot about a central axis $106s$. Lower shaft 46 is formed extending linearly from central axis $106r$ toward central axis $106s$.

Central axes 106*p*, 106*q*, 106*r*, and 106*s* extend in parallel to one another. Central axes 106*p* and 106*r* are arranged on the same straight line extending in the vertical direction. Central axes 106*q* and 106*s* are arranged on the same straight line extending in the vertical direction. The distance between central axes 106*p* and 106*q* is equal to the distance between central axes 106*r* and 106*s*.

Central axes 101*p* to 101*s* and central axes 106*p* to 106*s* extend in parallel to one another. In the usage state shown in FIG. 6, central axes 101*p*, 101*q*, 106*p*, and 106*q* are arranged on the same line extending horizontally. In the usage state shown in FIG. 6, central axes 101*r*, 101*s*, 106*r*, and 106*s* are arranged on the same line extending horizontally.

In support arm 10 according to the present embodiment, upper shaft 41 and lower shaft 46 are arranged offset with respect to each other in the direction of the axis on which parallel link 40 is pivoted, that is, the axial direction of central axes 106*p* to 106*r* (the direction indicated by arrow 111 in FIG. 7). A specific arrangement of upper shaft 41 and lower shaft 46 is similar to the above-described arrangement of upper shaft 31 and lower shaft 36.

Support arm 10 according to the present embodiment further has self-weight compensation devices 50 and 60. Self-weight compensation device 50 produces forces that cancel forces of gravity acting on parallel links 30 and 40, and self-weight compensation device 60 produces a force that cancels the force of gravity acting on parallel link 40.

Self-weight compensation device 50 has a spring part 51, a pulley 52, a pin 53, and a wire 56. Spring part 51 is supported by bracket 27, and pulley 52 is supported by lower shaft 36. When seen from the axial direction of central axes 101*p* to 101*s*, spring part 51 is provided at a position adjacent to bracket 27. Spring part 51 is composed of a plurality of springs coupled in parallel. Pulley 52 is supported rotatably at a position adjacent to bracket 26. Pin 53 is fixed to bracket 26. Pin 53 is arranged at the opposite side of central axis 101*r* relative to central axis 101*p*. Pin 53 is arranged on the line connecting central axes 101*p* and 101*r*. Wire 56 is hung between spring part 51 and pin 53. Wire 56 pulled out from spring part 51 extends in the direction approaching bracket 26. Furthermore, wire 56 is hung on pulley 52 to be changed in direction, and extends toward pin 53.

Self-weight compensation device 60 has a spring part 61, a pulley 62, a pin 63, and a wire 66. Spring part 61 is supported by bracket 28, and pulley 62 is supported by lower shaft 46. When seen from the direction of the axis on which parallel link 40 is pivoted, spring part 61 is provided at a position adjacent to bracket 28. Spring part 61 is composed of a plurality of springs coupled in parallel. Spring part 51 is composed of a greater number of springs than those of spring part 61 because self-weight compensation device 50 also produces the force that cancels the force of gravity acting on parallel link 40 in addition to that for parallel link 30. Pulley 62 is supported rotatably at a position adjacent to bracket 27. Pin 63 is fixed to bracket 27. Pin 63 is arranged at the opposite side of central axis 106*r* relative to central axis 106*p*. Pin 63 is arranged on the line connecting central axes 106*p* and 106*r*. Wire 66 is hung between spring part 61 and pin 63. Wire 66 pulled out from spring part 61 extends in the direction approaching bracket 27. Furthermore, wire 66 is hung on pulley 62 to be changed in direction, and extends toward pin 63.

When transitioning from the usage state shown in FIG. 6 to the stored state shown in FIG. 5, it is necessary to move upwardly the centers of gravity of parallel links 30 and 40 against the forces of gravity acting on parallel links 30 and 40. With support arm 10 according to the present embodiment, support arm 10 can be transitioned from the usage state to the stored state by a smaller force by providing self-weight compensation devices 50 and 60 that cancel these forces of gravity using spring forces.

Figure 8:
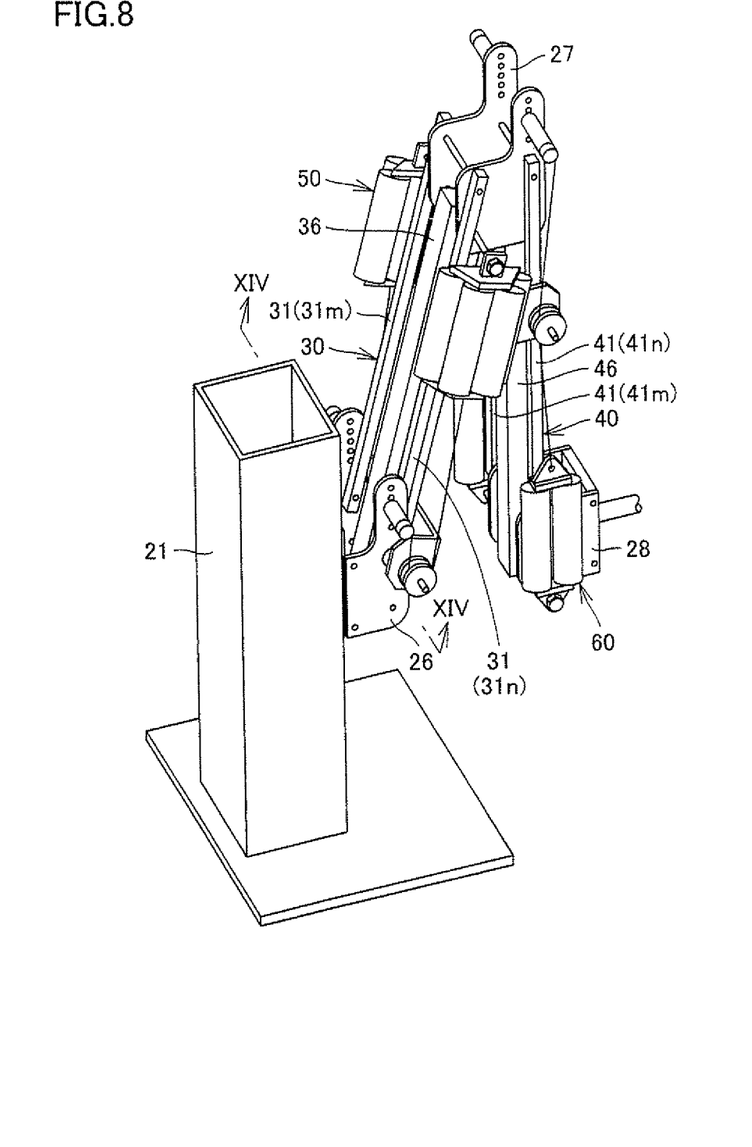
FIG. 8 is a perspective view showing the stored state of the support arm.
Figure 9:
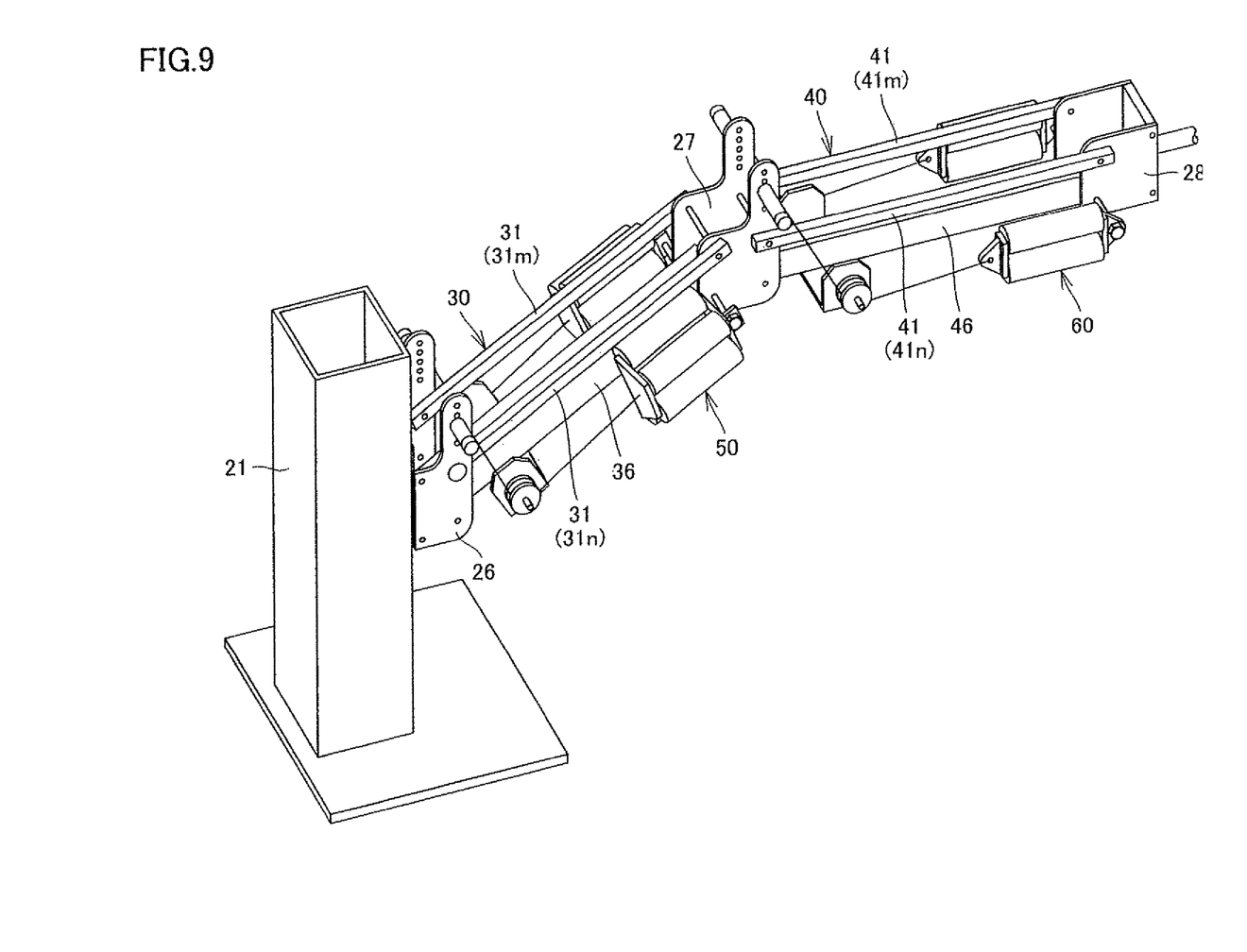
FIG. 9 is a perspective view showing an intermediate state between the stored state and the usage state of the support arm.
Figure 10:
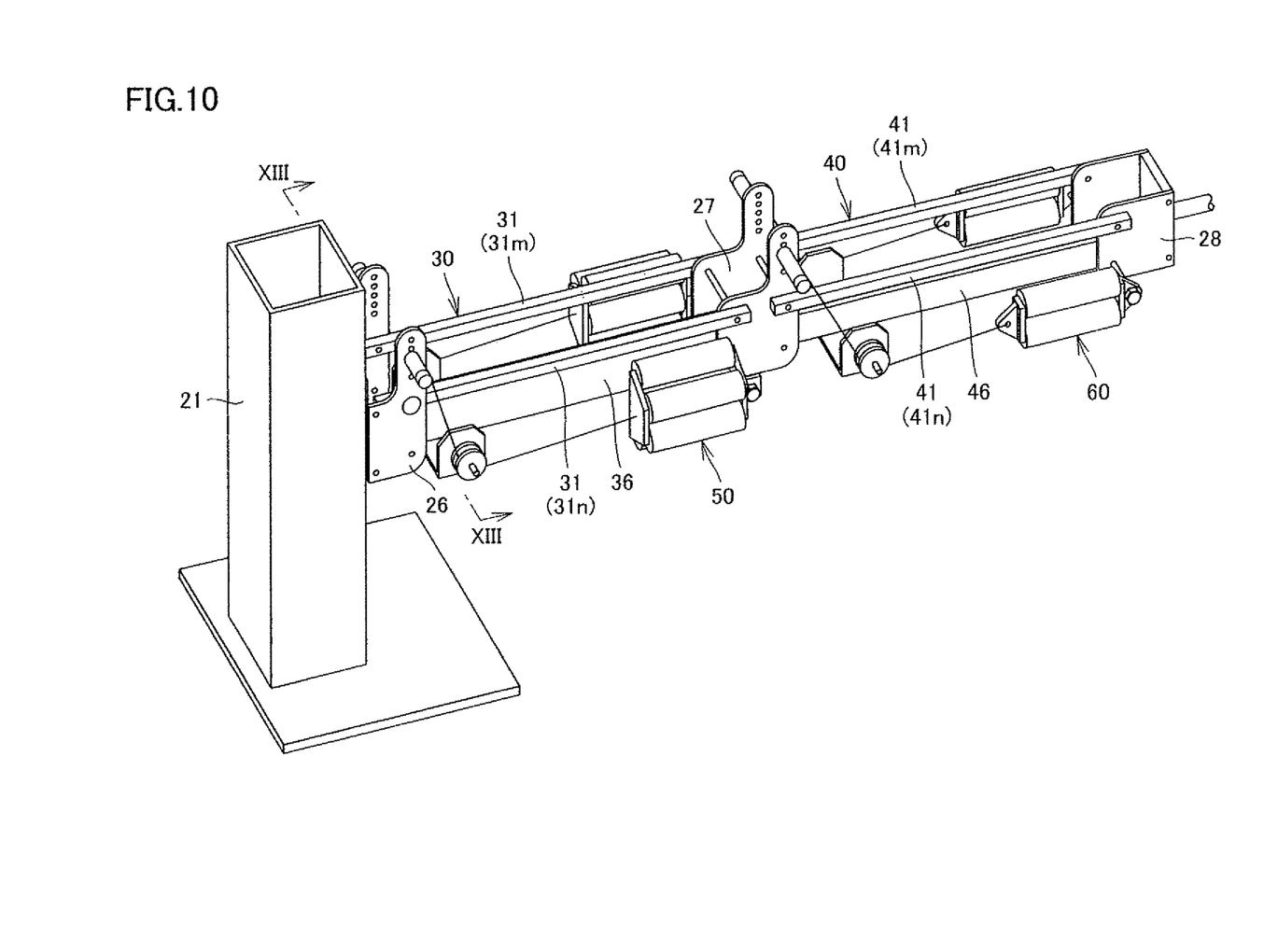
FIG. 10 is a perspective view showing the usage state of the support arm.
Figure 11:
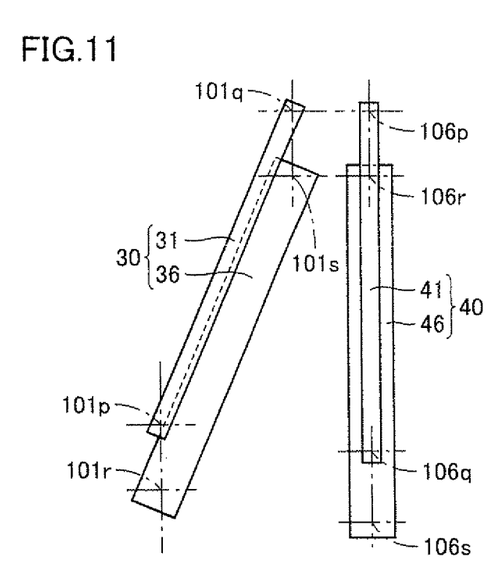
FIG. 11 is a side view showing the form of an upper arm and a lower arm when the support arm is stored.

FIG. 8 is a perspective view showing the stored state of the support arm. FIG. 9 is a perspective view showing an intermediate state between the stored state and the usage state of the support arm. FIG. 10 is a perspective view showing the usage state of the support arm. FIG. 11 is a side view showing the form of an upper arm and a lower arm when the support arm is stored.

Referring to FIGS. 8 to 11, in the stored state shown in FIG. 8, parallel link 30 is positioned so as to rise upwardly from bracket 26, and parallel link 40 is folded toward parallel link 40 with bracket 27 serving as a fulcrum. Particularly, in support arm 10 according to the present embodiment, parallel link 30 is positioned to extend from bracket 26 diagonally to the vertically upward direction, and parallel link 40 is positioned to extend from bracket 26 in the vertically downward direction. On the other hand, in the usage state shown in FIG. 10, parallel link 30 is positioned to extend horizontally from bracket 26, and parallel link 40 is also positioned to extend horizontally from bracket 27.

As support arm 10 moves between the stored state and the usage state, parallel links 30 and 40 change their inclinations. At this time, in parallel link 30, the distance between upper shaft 31 and lower shaft 36 when seen from the axial direction of central axes 101*p* to 101*s* changes while upper shaft 31 and lower shaft 36 maintain their parallel arrangement. Specifically, the distance between upper shaft 31 and lower shaft 36 is larger in the usage state, and the distance between upper shaft 31 and lower shaft 36 is smaller in the stored state. In parallel link 40, the distance between upper shaft 41 and lower shaft 46 when seen from the axial direction of central axes 106*p* to 106*s* changes while upper shaft 41 and lower shaft 46 maintain their parallel arrangement. Specifically, the distance between upper shaft 41 and lower shaft 46 is larger in the usage state, and the distance between upper shaft 41 and lower shaft 46 is smaller in the stored state.

In support arm 10 according to the present embodiment, upper shaft 31 and lower shaft 36 are arranged offset with respect to each other in the axial direction of central axes 101*p* to 101*s*, and upper shaft 41 and lower shaft 46 are arranged offset with respect to each other in the axial direction of central axes 106*p* to 106*s*, as described above. With such a structure, particularly as shown in FIG. 11, the stored state of support arm 10 can present the form in which upper shaft 31 and lower shaft 36 overlap each other when seen from the axial direction of central axes 101*p* to 101*s*, and upper shaft 41 and lower shaft 46 overlap each other when seen from the axial direction of central axes 106*p* to 106*s*. Upper shaft 31 and lower shaft 36 as folded can thereby be reduced in horizontal width, so that a compact stored state can be attained.

Figure 12:
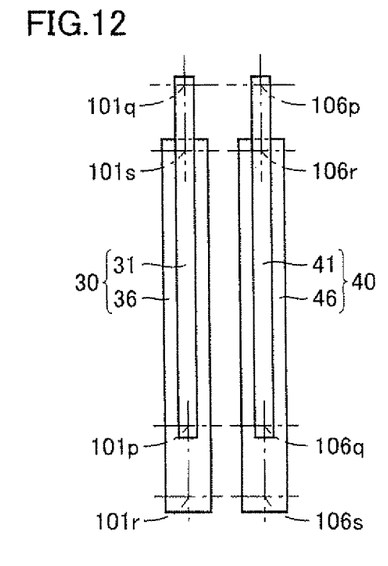
FIG. 12 is a side view showing a variation of the form of the e upper arm and the lower arm when the support arm is stored.

FIG. 12 is a side view showing a variation of the form of the upper arm and the lower arm when the support arm is stored. Referring to FIG. 12, in the present variation, in the stored state of support arm 10, parallel link 30 is positioned to extend from bracket 26 in the vertically upward direction, and parallel link 40 is positioned to extend from bracket 26 in the vertically downward direction. Parallel links 30 and 40 are positioned to be arranged in parallel to each other. With such a structure, an even more compact stored state can be attained.

It is noted that the number and arrangement of upper shaft 31 (41) and lower shaft 36 (46) are not limited to the form described above, but one upper shaft 31 (41) and two lower shafts 36 (46) may be provided, for example.

Figure 13:
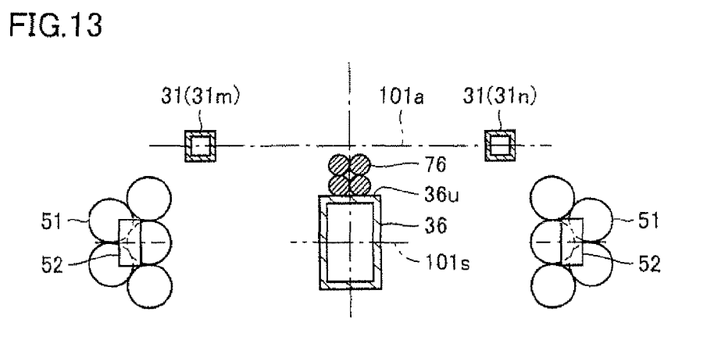
FIG. 13 is a cross sectional view showing the usage state of the support arm taken along the line XIII-XIII in FIG. 10.
Figure 14:
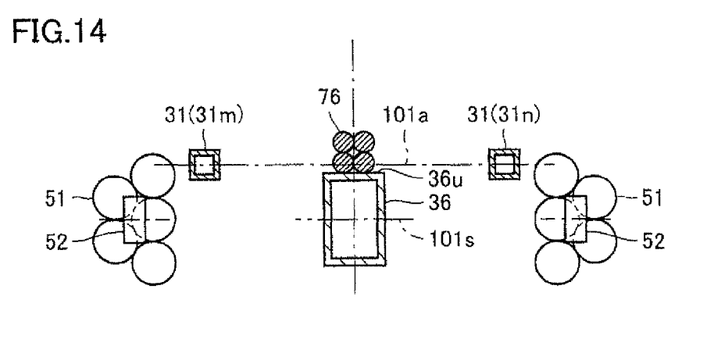
FIG. 14 is a cross sectional view showing the stored state of the support arm taken along the line XIV-XIV in FIG. 8.

FIG. 13 is a cross sectional view showing the usage state of the support arm taken along the line XIII-XIII in FIG. 10. FIG. 14 is a cross sectional view showing the stored state of the support arm taken along the line XIV-XIV in FIG. 8.

Referring to FIGS. 13 and 14, upper shaft 31 (upper shafts 31m, 31n), and spring part 51 and pulley 52 constituting self-weight compensation device 50 are arranged offset with respect to one another in the axial direction of central axes 101p to 101s. More specifically, spring part 51 and pulley 52 are arranged on the both sides of upper shaft 31 in the axial direction of central axes 101p to 101s. Such a structure can prevent upper shaft 31, spring part 51 and pulley 52 from interfering with one another in the stored state of support arm 10.

In the usage state of support arm 10, upper shaft 31m, lower shaft 36 and upper shaft 31n are arranged to be located at the vertices of triangle, respectively. Upper shaft 31 and lower shaft 36 each have a hollow tubular shape extending between brackets 26 and 27. Upper shaft 31 and lower shaft 36 each have a substantially rectangular sectional shape.

Lower shaft 36 has a thickness greater than that of upper shafts 31m and 31n provided as upper shaft 31. That is, if upper shaft 31 and lower shaft 36 are cut by a plane orthogonal to the direction in which brackets 26 and 27 are connected, lower shaft 36 has a circumferential length in cut cross section is greater than the circumferential length in cut cross section of upper shaft 31m and greater than the circumferential length in cut cross section of upper shaft 31n. In addition to the weight of lower shaft 36, the weight of upper shaft 31 acts on lower shaft 36. For this reason, by making the thickness of lower shaft 36 greater than the thickness of upper shafts 31m and 31n, the durability of support aim 10 can be improved.

In support arm 10 according to the present embodiment, a wiring line 76 is fixed to lower shaft 36. Wiring line 76 includes a power cable through which an electric current for charging the power storage device flows, an earth wire, a signal wire, and the like. Wiring line 76 is fixed to a top surface 36u of lower shaft 36. In the usage state of support arm 10, wiring line 76 is located inside a triangle connecting upper shaft 31m, upper shaft 31n and lower shaft 36. With such a structure, wiring line 76 can be supported more reliably by lower shaft 36 of great thickness and high rigidity. Moreover, since wiring line 76 is fixed to lower shaft 36 having a great thickness, heat emitted from wiring line 76 along with current application is radiated efficiently from lower shaft 36 having a large radiating area.

It is noted that, although the present embodiment has described the structure in which wiring line 76 is fixed to top surface 36u of lower shaft 36, the position at which wiring line 76 is fixed to lower shaft 36 is not particularly limited, but wiring line 76 may be passed through the hollow part of lower shaft 36, for example.

Figure 15:
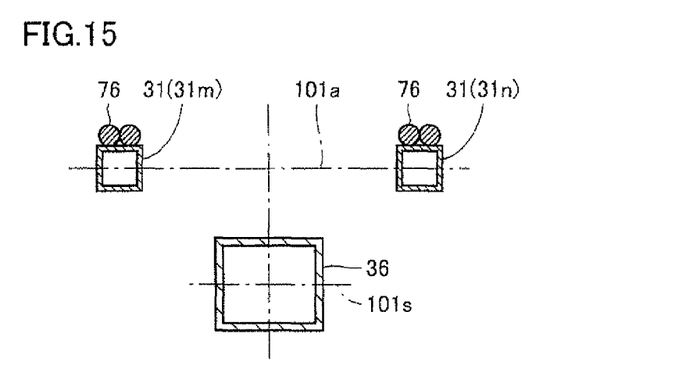
FIG. 15 is a cross sectional view showing a variation of the support arm shown in FIG. 13.

FIG. 15 is a cross sectional view showing a variation of the support arm shown in FIG. 13. Referring to FIG. 15, in the present variation, wiring line 76 is fixed to each of upper shafts 31m and 31n.

In such a structure, upper shafts 31m and 31n need to be increased in thickness so as to support wiring line 76. Furthermore, when upper shafts 31m and 31n are increased in thickness, lower shaft 36 on which the weight of upper shaft 31 acts needs to have an even greater thickness. In this case, the thicknesses of upper shaft 31 and lower shaft 36 will be greater than those in the case shown in FIG. 13, causing size increase of support aim 10. On the other hand, if wiring line 76 is fixed to lower shaft 36 as shown in FIGS. 13 and 14, support arm 10 is reduced in size, which can improve the operability at the time of charging the hybrid vehicle.

Although only the structure of parallel link 30 and self-weight compensation device 50 has been described above, parallel link 40 and self-weight compensation device 60 have a similar structure.

Summarizing the structure according to the support arm according to the embodiment of the present invention described above, support arm 10 according to the present embodiment includes bracket 26 as a first joint part supported by support 21 as a base, bracket 27 as a second joint part arranged away from bracket 26, parallel link 30 as a first parallel link arranged between brackets 26 and 27 and coupled pivotally to brackets 26 and 27, and self-weight compensation device 50 producing a force that cancels the force of gravity acting on parallel link 30. Parallel link 30 has upper shaft 31 as a first shaft and lower shaft 36 as a second shaft, arranged in parallel to each other with spacing, the spacing being changed with the pivoting movement of parallel link 30. Upper shaft 31 and lower shaft 36 are arranged offset with respect to each other in the direction of the axis on which parallel link 30 is pivoted.

With support arm 10 according to the embodiment of the present invention thus constructed, interference between upper shaft 31 and lower shaft 36 and interference between upper shaft 41 and lower shaft 46 are prevented, so that a large movable range can be set for support arm 10.

It should be understood that the embodiment disclosed herein is illustrative and non-restrictive in every respect. The scope of the present invention is defined by the claims not by the description above, and is intended to include any modification within the meaning and scope equivalent to the terms of the claims.

INDUSTRIAL APPLICABILITY

The present invention is mainly applied to a support arm for supporting a charging connector for a hybrid vehicle or the like.

REFERENCE SIGNS LIST 10 support arm; 21 support; 26, 27, 28 bracket; 30, 40 parallel link; 31, 31m, 31n, 41, 41m, 41n upper shaft; 36, 46 lower shaft; 36u top surface; 50, 60 self-weight compensation device; 51, 61 spring part; 52, 62 pulley; 53, 63 pin; 56, 66 wire; 71 charging connector attachment part; 76 wiring line; 101p to 101s, 106p to 106s central axis; 200 hybrid vehicle; 200A body; 200C charging connector; 200B fuel supply connector; 201C body; 202C connecting part; 203C power wiring line; 210 internal combustion engine; 220 transaxle; 221 power split mechanism; 230 fuel tank; 240 power storage device; 250 fuel supply part; 260 electric power supply unit; 261 outer lid; 262 head part; 263 inner lid

The invention claimed is:

1. A support arm comprising:
a first joint part supported by a base;
a second joint part arranged away from said first joint part;
a first parallel link arranged between said first joint part and said second joint part and coupled pivotally to said first joint part and said second joint part; and
a self-weight compensation device producing a force that cancels a force of gravity acting on said first parallel link,
said first parallel link having a first upper shaft, a second upper shaft, and a lower shaft, said first upper shaft and said second upper shaft being arranged in parallel to said lower shaft with spacing therebetween, the spacing being changed with a pivoting movement of said first parallel link, said first upper shaft and said second upper shaft being arranged offset from said lower shaft in a direction of an axis on which said first parallel link is pivoted, when said first parallel link is positioned to extend laterally from said first joint part, said first upper shaft and said second upper shaft being located above said lower shaft, said lower shaft having a thickness greater than the thickness of said first upper shaft and the thickness of said second upper shaft, a wiring line extending from said first joint part toward said second joint part being fixed to said lower shaft, said wiring line being directly supported by said lower shaft between said first joint part and said second joint part, said first upper shaft, said second upper shaft, and said lower shaft being disposed at vertices of a triangle, respectively, said lower shaft being a hollow tubular member having a substantially rectangular sectional shape, and said lower shaft having a top surface located on the outer side of the tubular member, said wiring line being fixed to said top surface.

2. The support arm according to claim 1, wherein a stored state of the support arm is attained when said first parallel link is positioned to rise upwardly from said first joint part, and in the stored state, said first upper shaft, said second upper shaft, and said lower shaft are arranged to overlap each other when seen from the direction of the axis on which said first parallel link is pivoted.

3. The support arm according to claim 2, wherein in the stored state of the support arm, said first upper shaft, said second upper shaft, and said lower shaft extend in a vertical direction from said first joint part toward said second joint part.

4. The support arm according to claim 1, wherein the first upper shafts and the second upper shafts are arranged symmetrically on both sides of said lower shaft in the direction of the axis on which said first parallel link is pivoted.

5. The support arm according to claim 1, further comprising:

a third joint part arranged away from said second joint part; and a second parallel link arranged between said second joint part and said third joint part and coupled pivotally to said second joint part and said third joint part, wherein said second parallel link has a third shaft and a fourth shaft arranged in parallel to each other with spacing, the spacing being changed with a pivoting movement of said second parallel link, and said third shaft and said fourth shaft are arranged offset with respect to each other in a direction of an axis on which said second parallel link is pivoted.

6. The support arm according to claim 5, wherein a stored state of the support arm is attained when said first parallel link is positioned to rise upwardly from said first joint part and said second parallel link is folded toward said first parallel link with said second joint part serving as a fulcrum, and in the stored state, said first upper shaft, said second upper shaft, and said lower shaft are arranged to overlap each other when seen from the direction of the axis on which said first parallel link is pivoted, and said third shaft and said fourth shaft are arranged to overlap each other when seen from the direction of the axis on which said second parallel link is pivoted.

7. The support arm according to claim 1, further comprising a charging connector provided to be connectable to a vehicle, and moving with the pivoting movement of said first parallel link.

* * * * *